Patented May 15, 1945

2,375,838

UNITED STATES PATENT OFFICE 2,375,838

INSOLUBLE CELLULOSE DERIVATIVES AND PROCESSES FOR THEIR PRODUCTION

Cole Coolidge and John S. Reese, IV, Wilmington, Del., assignors to E. I. du Pont de Nemours & Company, Wilmington, Del., a corporation of Delaware No Drawing. Application August 5, 1942, Serial No. 453,694

8 Claims. (Cl. 260—213)

This invention relates to a new class of cellulose derivatives which are insoluble in organic solvents, and processes for their production and use.

Numerous cellulose derivatives have heretofore been described in the scientific literature. These derivatives are for the most part suitable for use as films, sheetings, molded articles, fibers and the like. The great majority of them are, however, subject to the disadvantage that they are soluble in various organic solvents and possess a relatively low softening point. As a result they are susceptible to damage from solvents such as dry cleaning fluids or from excessive heating as when fabrics are ironed.

Attempts have been made to overcome the aforementioned disadvantages by modifying the cellulose derivatives with certain bifunctional reagents. These modified derivatives are somewhat superior to the parent compounds in that they are generally insoluble and their softening points are raised to a certain extent. Despite this fact, however, the modified derivatives are still subject to the disadvantage that they are brittle to an undesirable degree. Likewise, they are subject to superficial fusion when heated, thereby producing an objectionable shine on the modified fabrics.

It is an object of this invention to overcome the aforesaid disadvantages of prior art cellulose derivatives and numerous other disadvantages which directly or indirectly result therefrom. A further object of the invention is to produce a class of cellulose derivatives which are insoluble in organic solvents. A still further object is to produce a class of cellulose derivatives which will not fuse when subjected to high temperatures. A still further object is to produce a class of cellulose derivatives which not only possess the foregoing advantages but are also quite flexible. A still further object is to produce sheets, yarns and shaped articles generally from modified cellulose derivative solutions, in particular modified cellulose acetate solutions, and thereafter to render the modified compounds insoluble by suitable treatment. Additional objects will become apparent from the following description and claims.

These objects are attained in accordance with the present invention wherein a cellulose derivative containing free hydroxyl groups is reacted with a polyalkoxyalkyl melamine under such conditions that the resulting condensation product is insoluble in organic solvents and possesses a much higher fusion point than the parent cellulose derivative. In a more restricted sense this invention is concerned with insoluble cellulose derivatives produced by reacting a cellulose derivative containing free hydroxyl groups and soluble in an organic solvent with a crystalline, monomeric polyalkoxymethyl melamine at elevated temperatures and for a sufficient period of time to insolubilize the resulting modified cellulose derivative. In a still more restricted sense this invention is directed to improved cellulose derivatives produced by dissolving a cellulose derivative containing free hydroxyl groups, and a crystalline, monomeric polyalkoxymethyl melamine in a common solvent, removing the solvent therefrom and subjecting the resulting mass to elevated temperatures for a sufficient period of time to insolubilize the so-produced cellulose derivative and increase its fusion point. In a still more restricted embodiment this invention is concerned with products produced by the previously mentioned processes wherein such products are extruded to form a mass of the desired shape prior to the removal of the solvent and insolubilization of the cellulose derivative so produced. In its preferred embodiment this invention is directed to improved cellulose derivatives produced by dissolving cellulose acetate containing free hydroxyl groups, and crystalline, substantially pure monomeric N,N',N''-tris (ethoxymethyl)-melamine in acetone, extruding the resulting solution to form a mass of the desired shape, removing the solvent therefrom and subjecting the resulting mass to elevated temperatures for a sufficient period of time to insolubilize the so-produced and shaped cellulose derivative. In a still more preferred embodiment the immediately preceding process is carried out under selected conditions and with narrowly defined amounts of the individual reactants to produce final products of optimum value.

In accordance with this invention an organic solvent-soluble cellulose derivative which contains free hydroxyl groups is modified by subjecting it in an intimate mixture with a polyalkoxymethyl melamine to elevated temperatures for a sufficient period of time to produce an insoluble and substantially infusible product. For example, cellulose acetate containing free hydroxyl groups is dissolved in acetone with an acetone-soluble crystalline, monomeric polyalkoxymethyl melamine, from 99 to 75 parts by weight of the cellulose acetate being used for from 1 to 25 parts of the melamine ether. The resulting solution is extruded into sheets, films, fibers or other articles of the desired shape, and the solvent removed therefrom. The solvent-free article is then baked at elevated temperatures for a sufficient period of time to insolubilize the product, for instance 160° C. for 90 minutes. The resulting product is not only insoluble, but is infusible at temperatures greatly above the softening point of the parent cellulose acetate.

The invention may be more readily understood by a consideration of the following illustrative examples:

Example I

A solution is prepared by dissolving 15 parts by weight of cellulose acetate (54.5 per cent combined acetic acid) and 1.5 parts of N,N',N''-tris-(ethoxymethyl)melamine as prepared in the hereafter cited pending patent application, in 85 parts of acetone. The solution is cast into a film by spreading on a plate glass with a doctor knife. The dry film is removed from the plate after overnight exposure to a dry atmosphere, and the residual solvent is removed by a three-day aging of the film at 65° C. The film is then heated at 160° C. for 90 minutes. In contrast to an unmodified cellulose acetate film which is completely soluble in acetone, the film which is prepared in the above manner is insoluble in acetone. Furthermore, whereas an unmodified cellulose acetate film suffers superficial fusion at 195° C. being the temperature at which, when held under a 200 g. weight, it first adheres to a brass block, the above modified film exhibits such superficial fusion first at a temperature of 210° C. about 15 degrees higher in addition to being quite infusible at temperatures up to 250° C. and above. The modified film is of excellent clarity and in appearance indistinguishable from unmodified film.

Example II

A solution is prepared by dissolving 15 parts by weight of cellulose acetate (54.5 per cent combined acetic acid) and 0.75 part of N,N',N''-tris-(ethoxymethyl)melamine in 85 parts of acetone. From this solution a film is prepared in the same manner as described in Example I and then heated at 160° C. for 90 minutes. This film is perfectly clear and, though indistinguishable in appearance from unmodified cellulose acetate, it is insoluble in acetone. In addition to being substantially infusible at any temperature, this film first suffers superficial fusion as described in Example I at 200° C., about five degrees above that at which an unmodified cellulose acetate film first suffers superficial fusion.

Example III

A solution is prepared by dissolving 15 parts by weight of cellulose acetate (54.5 per cent combined acetic acid) and 1.25 parts of N,N',N''-tris-(ethoxymethyl)melamine in 85 parts of acetone. From this solution a film is prepared in the same manner as described in Example I and then heated at 160° C. for 90 minutes. This film is perfectly clear and though indistinguishable in appearance from an unmodified cellulose acetate film, it is insoluble in acetone. In addition to being substantially infusible at any temperature, this film first exhibits superficial fusion as described in Example I, at 210° C., or about 15 degrees above that at which an unmodified cellulose acetate film first exhibits superficial fusion. When a film prepared as described above is tested for flexibility at a thickness of 0.0025 in. by the method of repeatedly folding in alternate directions until breakage, it is observed to fold thus for a total of 8 times, whereas exactly the same film modified with non-preferred but effective amounts of N,N',N''-tris(ethoxymethyl)melamine, for example, six-tenths of a part or one and one-half parts per 15 parts by weight of cellulose acetate, break on the first fold.

Example IV

A solution is prepared by dissolving 15 parts by weight of cellulose nitrate (11.06% combined nitrogen) and 1.5 parts of N,N',N''-tris(methoxymethyl)melamine (prepared as described in copending patent application, Serial No. 387,771, filed April 19, 1941) in 85 parts of acetone. From this solution a film is prepared in the same manner as described in Example I and then heated at 140° C. for 45 minutes. This film is perfectly clear and, although indistinguishable in appearance from an unmodified cellulose nitrate film, it is insoluble in acetone. In addition to being substantially infusible at any temperature, this film first suffers superficial fusion as described in Example I at 190° C., about 30 degrees above that at which an unmodified celluulose nitrate film first suffers superficial fusion.

Example V

A solution is prepared by dissolving 22.5 parts by weight of cellulose acetate (54.5 per cent combined acetic acid) and 2.5 parts of N,N',N''-tris-(ethoxymethyl)melamine in 75 parts of acetone. After filtering to remove all traces of insoluble residue, the solution is formed by extrusion into a continuous filament yarn of 100 denier and 40 filaments, using the well known method of dry spinning. In this method the solution is extruded under pressure of 300-400 lbs./sq. in. and at a temperature of about 59° C. through the desired number of holes into a chamber through which passes a current of hot air. The multiplicity of fine filaments which are thus formed is wound up continuously on the surface of a revolving drum at a speed which is equivalent to or just slightly greater than that at which the modified cellulose acetate is extruded. After twisting so that it contains a twist of 4 turns per inch, the yarn is given a heating of 90 minutes at 160° C. When tested the yarn is found to be completely insoluble in acetone in contrast to unmodified cellulose acetate yarn which dissolves very readily in this solvent. The modified yarn is found to have a tenacity which is essentially equivalent to that possessed by a similar but unmodified yarn. Whereas a similar but unmodified yarn is completely fused at 250° C., the yarn modified as just described is substantially infusible at any temperature. Furthermore, unlike previously described cellulose acetate yarn modified with bifunctional reagents which suffer superficial fusion, as indicated by sticking to a brass block when held under a 200 g. weight, at the same temperature as unmodified cellulose acetate yarn, the above described yarn first exhibits superficial fusion at a temperature of 185-195° C., which is 35-40 degrees above that at which the unmodified yarn first exhibits superficial fusion.

Example VI

A solution is prepared by dissolving 23.75 parts by weight of cellulose acetate (54.5 per cent combined acetic acid) and 1.925 parts of N,N',N''-tris(ethoxymethyl)melamine in 75 parts of acetone. After filtering to remove all traces of insoluble residue, the solution is formed by extrusion into a continuous filament yarn of 100 denier and 40 filament, using the well known method of dry spinning, as described in Example V. After twisting so that it has a twist of 4 turns per inch, the yarn is given a heating of 90 minutes at 160° C. When tested the yarn is found to be completely insoluble in acetone in contrast to unmodified yarn which dissolves very readily in this solvent. The modified yarn is found to have a tenacity which is essentially equivalent to that which is possessed by a similar but unmodified yarn. Furthermore, unlike unmodified yarn to the extent that it is substantially infusible at any temperature, it has the added advantage of exhibiting superficial fusion as described in Example V, first at 175–185° C. which is about 25–30° C. above that at which the unmodified yarn first shows superficial fusion. Also, whereas a cellulose acetate yarn which has been modified with an arbitrary concentration of N,N',N''-tris-(ethoxymethyl)melamine such as 2.5 parts per 22.5 parts of cellulose acetate, has a loop tenacity as determined on a Suter machine of 1.04 g. per denier and an elongation at break of 3 per cent, the yarn modified as described in this example has a loop tenacity of 1.25 g. per denier and an elongation at break of 8 per cent.

It is to be understood that the foregoing examples are representative merely of a few of the many modifications to which this invention may be subjected. They may be varied widely with respect to the individual reactants, the amounts thereof, and the conditions of reaction without departing from the scope of this invention.

Cellulose derivatives which are contemplated for use herein include those suitable for use in films, sheeting, molded articles, yarns, fibrous material and rayon. Derivatives of this type are cellulose esters and ethers such as cellulose acetate, cellulose formate, cellulose propionate, cellulose butyrate, cellulose acetate propionate, ethyl cellulose, benzyl cellulose, butyl cellulose, cellulose nitrate, cellulose acetate nitrate and the like. These other cellulose derivatives satisfactory for use herein should contain free hydroxyl groups and should be soluble in organic liquids.

Cellulose acetate is the preferred derivative for use herein in the preparation of a wide variety of products having very desirable properties. Cellulose acetate containing 54.5% combined acetic acid has been referred to in the examples. However, any other degree of esterification below the triester state, i. e., any cellulose acetate containing free hydroxyl groups may likewise be treated in accordance with the instructions hereof.

Polyalkoxymethyl melamines contemplated for use herein are those melamine derivatives having two or more alkoxylmethyl groups substituted thereon. A few of the many compounds conforming to this requirement are N,N',N''-tris-(ethoxymethyl)melamine, N,N',N''-tris(methoxymethyl)melamine, the corresponding N,N',N''-tris-(propoxy-, isopropoxy-, butoxy-, amyloxy-, isoamyloxy-, hexyloxy, and heptyloxymethyl) melamines; mixed ethers thereof where the alkyl groups on the melamine nucleus differ from one another, such as N,N'-bis(ethoxymethyl)-N''-(methoxymethyl)melamine, for example. In place of the foregoing tris derivatives, it is to be understood that melamine derivatives having but two of the ether groups previously mentioned or others suggested thereby may also be employed. As a general rule any trialkyl or dialkyl ether of trimethylolmelamine which is soluble in an organic liquid in which the cellulose derivative to be modified is also soluble may be employed.

It is advisable to use a crystalline, monomeric polyalkoxymethylmelamine for most satisfactory results. This crystalline product should be substantially free from resinous polymeric materials, as small amounts of such impurities may defeat the purposes of the invention since they interfere with the desired reaction to a surprising extent and are likely to produce a product which does not possess the properties previously referred to.

Practically any solvent may be used in which both the cellulose derivative and the polyalkoxymethyl melamine are soluble. A few of the many solvents contemplated for use in this connection are chloroform, ethyl acetate, dioxane, benzyl alcohol, methyl cellosolve, diacetone alcohol, acetone, chloroform-alcohol, ethyl acetate-alcohol, benzene-alcohol, methylene chloride-ethyl alcohol, etc. For optimum results in numerous reactions acetone is the preferred solvent. The more volatile solvents are generally preferred since their use facilitates both the casting of films and the spinning of fibers. Higher boiling and less volatile solvents may, however, be used in which case the casting or spinning operation is conducted at somewhat higher temperatures.

The amounts and types of reactants used and the conditions of reaction, as is obvious, will vary widely depending upon the particular purposes for which the ultimate products are desired. No attempt will be made to describe at length the numerous variations in these factors since they are so closely interrelated and may be determined accurately for any given operation by means of a few simple tests in accordance with the instructions hereof.

With the respect to the concentration of cellulose derivative and polyalkoxymethyl melamine, the following general suggestions are offered: The amounts of these materials used are ordinarily within the range of 99–75 parts by weight of cellulose derivative for 1 to 25 parts of melamine derivative. The aforesaid range does not delineate the outer bounds contemplated by the invention but it will be found that the great majority of reactions will be embraced therein. Where cellulose acetate is the cellulose derivative about 9 parts of this material and about 1 part of the N,N',N''-tris(ethoxymethyl)melamine will be found to give excellent results with respect to insolubility and infusibility. A still more desirable concentration is 7–8 parts of N,N',N''-tris(ethoxymethyl)melamine for 93–92 parts of cellulose acetate as within this range the product retains the flexibility and other good mechanical properties of unmodified cellulose acetate. If pronounced flexibility of the final product is not of importance a somewhat larger amount of melamine derivative may be used than where this property is highly desirable.

The amount of solvent used may, as in the case of the remaining factors, vary widely. It should be sufficient to dissolve the reactants and permit intimate contact therebetween while at the same time permitting the resulting solution to be processed in the selected manner. An amount of solvent corresponding to from three to ten times the total amount of reactants, by weight, will usually be found to give very satisfactory results. Larger or smaller amounts may, of course, be used.

The solution of reactants previously described may be further modified by the addition of plasticizers and/or other assistants which improve the characteristics of the final products or the processes whereby they are produced. A few representative materials of this type are dimethyl phthalate, dimethoxy ethyl phthalate, triphenyl phosphate, mixtures of the same and the numerous other plasticizers and assistants known and described in the art. Addition of materials which hasten the succeeding baking treatment may also take place at this time. Such materials are generally of an acidic nature such as phthalic anhydride, phthalic acid, citric acid, ammonium iodide, etc. The amount of this material employed will depend to a considerable extent upon its activity and the manner in which the solution is to be processed. Ordinarily amounts from a few one-hundredths of one per cent to two per cent, by weight, based on the amount of melamine ether present, will be sufficient. These materials frequently increase the viscosity of the solution so they should be used sparingly, especially where a low viscosity solution is desired for the extrusion operation. However, they are quite helpful in hastening completion of the final reaction, whether is be baking, heat immersion, or the like, as hereinafter described.

When the solution of reactants is completed and intimate contact is obtained between them it is frequently advisable to filter it in order to remove any traces of insoluble residue. Filtration may be carried out with multi-layers of cotton wadding or other material under pressures as high as several hundred pounds per square inch.

The solution of reactants after filtration as aforesaid, if desired, is advisably extruded to form a mass of the desired shape. If a sheet of the final product is desired the solution may be cast upon a flat surface and smoothed with a doctor knife. If a yarn is desired the solution is extruded under pressure through a die containing the type of apertures into which it is desired to form the final product, for instance, a multifilament yarn may be produced by extrusion under a pressure of 300–400 lbs. per square inch through a multiplicity of fine holes into a chamber into which passes a current of hot air to evaporate the solvent. In the same general manner the extrusion of the solution may be so regulated as to produce a product of almost any desired shape. When necessary the solution may be concentrated or diluted prior to extrusion in order to facilitate formation of the extruded product.

Prior to the shaping of the modified solution by casting into film, extrusion into filaments or by other means, it is usually advisable to prevent exposure of the solution to elevated temperatures. Otherwise, its viscosity may rise to a prohibitive degree and interfere with its subsequent extrusion. By keeping these solutions at approximately room temperature the aforesaid undesirable results may be avoided.

After extrusion and shaping the solvent is removed from the shaped article in any suitable manner. This is generally accomplished by subjecting the article to somewhat elevated temperatures for a sufficient period to drive off all, or substantially all, of the solvent. Atmospheric, superatmospheric or subatmospheric pressures may be employed for this purpose.

Upon removal of the solvent the article is ready for the final step in the process. This involves insolubilizing the product and rendering it substantially infusible. It may be accomplished by subjecting the article to elevated temperatures for a sufficient time to produce the desired result. The temperatures selected may vary widely, for example, from about 50° C. practically up to the decomposition point of the components of the article. Since the time will vary inversely with the temperature, low temperatures may require several days to complete the reaction, whereas at high temperatures this time will be reduced to a matter of hours or even minutes. Temperatures from about 135° C. to about 175° C. will generally be sufficient, and the corresponding times will ordinarily be from about 8 hours to about 30 minutes, respectively.

In place of the aforesaid baking treatment the modified composition may be completed by immersing the solvent-free, shaped article in a hot liquid. This liquid should not be a solvent for the cellulose derivative, the melamine derivative or their intermedate condensation products. Inert liquids such as kerosene and other high-boiling hydrocarbons are satisfactory for this purpose. As a general rule, the temperature and time for this immersion treatment will be about the same as for the baking treatment.

The products of the present invention are suitable for use in many applications where cellulose derivatives are now employed. These uses include all types of film, sheeting, molded articles, and textiles. For all of these purposes the present products are admirably adapted, since, unlike ordinary cellulose derivatives, they will be highly resistant to the damaging effect of both organic liquids and high temperatures. The use of articles made from ordinary cellulose derivatives is restricted where there is a probability of exposure either to organic liquids or high temperatures. The products of this invention will overcome largely, therefore, these restrictions and extend considerably the possible uses thereof. These products are particularly valuable in the manufacture of textiles. For instance, the herein modified cellulose acetate in the form of yarn can be woven or knitted into fabrics which will prove to be highly resistant to organic solvents. Not only will these fabrics be unaffected by accidental exposure to such a solvent as acetone, but they will not require the use of special dry-cleaning fluids as is now the case for ordinary acetate materials. Furthermore, infusibility of this product will prevent the damage caused to acetate fabrics when ironed at temperatures which are perfectly safe for other widely used textile materials such as cotton and viscose rayon.

As many widely different embodiments of this invention may be made without departing from the spirit and scope thereof, it is to be understood that the invention is not limited to the specific embodiments thereof except as defined in the appended claims.

We claim:
1. A process for producing insoluble cellulose derivatives which comprises reacting a cellulose derivative containing free hydroxyl groups and soluble in an organic solvent with a crystalline, monomeric polyalkoxymethyl melamine.
2. A process for producing improved cellulose derivatives which comprises dissolving cellulose acetate containing free hydroxyl groups and a crystalline, monomeric polyalkoxymethyl melamine in a common solvent, removing the solvent therefrom and subjecting the resulting mass to elevated temperatures for a sufficient period of time to insolubilize the so-produced cellulose derivative.

3. Products produced in accordance with the process described in claim 1.

4. Products produced in accordance with the process described in claim 2.

5. A process for producing improved cellulose derivatives which comprises dissolving about 9 parts of cellulose acetate containing free hydroxyl groups and about 1 part of a crystalline, monomeric polyalkoxymethyl melamine in a common solvent, removing the solvent therefrom and subjecting the resulting mass to elevated temperatures for a sufficient period of time to insolubilize the so-produced cellulose derivative.

6. A process for producing improved cellulose derivatives which comprises dissolving about 93 to 92 parts of cellulose acetate containing free hydroxyl groups and about 7 to 8 parts of crystalline, monomeric N,N',N''-tris(ethoxymethyl)-melamine in a common solvent, removing the solvent therefrom and subjecting the resulting mass to elevated temperatures for a sufficient period of time to insolubilize the so-produced cellulose derivative.

7. Products produced in accordance with the process described in claim 5.

8. Products produced in accordance with the process described in claim 6.

COLE COOLIDGE.
JOHN S. REESE, IV.